3,132,134
WATER-INSOLUBLE MONOAZO-DYESTUFFS AND PROCESS FOR PREPARING THEM
Ernst Fischer, Konrad Löhe, and Joachim Ribka, Offenbach (Main), Germany, assignors to Farbwerke Hoechst Aktiengesellschaft vormals Meister Lucius & Brüning, Frankfurt am Main, Germany, a corporation of Germany
No Drawing. Filed Oct. 31, 1961, Ser. No. 148,835
Claims priority, application Germany Nov. 4, 1960
4 Claims. (Cl. 260—193)

The present invention relates to new water-insoluble monoazo-dyestuffs and to a process for preparing them, in particular it relates to dyestuffs having the following general formula

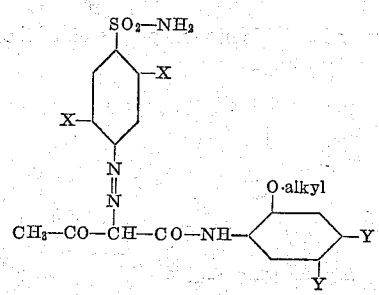

in which X represents a halogen atom, an alkyl or alkoxy group, one Y represents an alkoxy group and the other Y represents a halogen atom.

We have found that valuble water-insoluble monoazo-dyestuffs are obtained by coupling a diazonium compound of an amine having the general formula

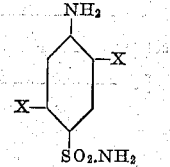

in which X represents a halogen atom, an alkyl or alkoxy group, with a coupling component having the general formula

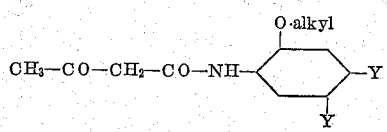

in which one Y represents an alkoxy group and the other Y represents a halogen atom.

The diazo components used in the process of this invention can be prepared by known methods, for example by treating 1-acylaminobenzenes substituted in 2- and 5-position with chlorosulfonic acid, then reacting the 2.5-disubstituted 1-acylaminobenzene-4-sulfonic acid chlorides so obtained with aqueous ammonia to form the corresponding sulfonic acid amides and subsequently saponifying the acylamino group.

The new dyestuffs are prepared by known methods, for example by coupling the diazonium compounds with the coupling components in an aqueous medium in the presence of a wetting or dispersing agent.

The dyestuffs obtainable by the present invention are water-insoluble pigments which are distinguished by a good fastness to solvents. They are suitable for the preparation of colored lacquers or lake formers, for the preparation of colored solutions or products of acetyl cellulose, nitrocellulose, natural or artificial resins, such as polymerization or condensation resins, for example aminoplasts or phenoplasts, furthermore, polystyrene, polyethylene, polyacryl compounds, polyvinyl compounds such, for example as polyvinyl chloride or polyvinyl acetate, and also rubber, casein or silicone resins. The new dyestuffs are also suitable for pigment printing on a substratum, especially on textile fibers or on other flat structures, such as paper. They can also be used for other purposes, for example in a state of fine subdivision for dyeing viscose rayon or cellulose ethers and cellulose esters, polyamides or polyurethanes in the spinning solution, or for coloring paper.

As compared with the water-insoluble monoazo-dyestuffs of similar constitution disclosed in German Patent No. 845,374, the dyestuffs obtainable by the present invention are distinguished by improved properties of fastness.

The following examples serve to illustrate the invention, the parts being by weight unless otherwise stated and the relationship of parts by weight to parts by volume being the same as that of the kilogram to the liter.

*Example 1*

11.6 parts of 1-amino-2,5-dimethoxybenzene-4-sulfonic acid amide are stirred for 1 hour with 30 parts by volume of 5 N-hydrochloric acid and 60 parts by volume of water. The mixture is then diazotized by the addition of 10.2 parts by volume of 5 N-sodium nitrite solution. The diazo solution so obtained is clarified and coupled at 15° C. with a weakly acid aqueous suspension of 15 parts of 1-acetoacetylamino-2,5-dimethoxy-4-chlorobenzene which was prepared by dissolving this compound in dilute sodium hydroxide solution and re-precipitating it with glacial acetic acid in the presence of a reaction product from about 20 mols of ethylene oxide and 1 mol of octadecyl alcohol. When the coupling is complete, the mixture is rendered alkaline and heated for 1 hour to boiling temperature. The dyestuff formed is then filtered off, washed and dried. It is a yellow powder.

A nitro-cellulose lacquer prepared with this dyestuff yields a yellow lacquering having a good fastness to over-spraying. By incorporating the dyestuff into polyvinyl chloride a yellow coloration of a good fastness to bleeding is obtained.

*Example 2*

10.8 parts of 1-amino-2-methoxy-5-methylbenzene-4-sulfonic acid amide are diazotized as described in Example 1. The diazo solution is clarified and coupled at 15° C. with a weakly acid aqueous suspension of 15 parts of 1-acetoacetylamino-2,5-dimethoxy-4-chlorobenzene which was prepared by dissolving this compound in dilute sodium hydroxide solution and re-precipitating it with glacial acetic acid in the presence of a reaction product from about 20 mols of ethylene oxide and 1 mol of octadecyl alcohol. When the coupling is complete, the dyestuff formed is filtered off and heated with glacial acetic acid for 30 minutes at 120° C. The dyestuff suspension is then poured into water, the precipitated dyestuff is filtered off, washed with water until neutral and dried. It is a yellow powder.

A nitro-cellulose lacquer prepared with this dyestuff yields a yellow lacquering having a good fastness to over-spraying. By incorporating the dyestuff into polyvinyl chloride a yellow coloration of a good fastness to bleeding is obtained.

In the following table further components are listed which can be used in the process of the present invention, as well as the tints of the dyestuffs prepared in substance.

| Diazo component | Coupling component | Tint |
|---|---|---|
| 1-amino-2,5-dimethoxy-benzene-4-sulfonic acid amide. | 1-acetoacetylamino-2,5-diethoxy-4-chlorobenzene. | Yellow. |
| Do. | 1-acetoacetylamino-2,4-dimethoxy-5-chlorobenzene. | Do. |
| 1-amino-2-chloro-5-methylbenzene-4-sulfonic acid amide. | 1-acetoacetylamino-2,5-dimethoxy-4-chlorobenzene. | Do. |
| 1-amino-2-methoxy-5-chlorobenzene-4-sulfonic acid amide. | ____do____ | Do. |
| 1-amino-2-methyl-5-chlorobenzene-4-sulfonic acid amide. | ____do____ | Do. |
| 1-amino-2,5-dimethylbenzene-4-sulfonic acid amide. | ____do____ | Do. |
| 1-amino-2-methyl-5-methoxybenzene-4-sulfonic acid amide. | ____do____ | Do. |

We claim:
1. Water-insoluble monoazo-dyestuffs of the following formula

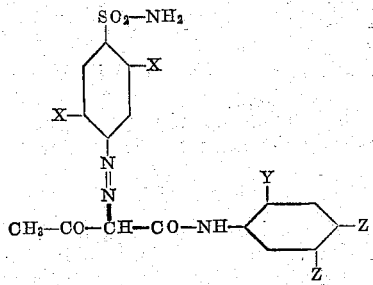

wherein X represents a member selected from the group consisting of chlorine, methyl and methoxy, Y represents a member selected from the group consisting of methoxy and ethoxy, one Z stands for chlorine and the other Z stands for a member selected from the group consisting of methoxy and ethoxy.

2. The water-insoluble monoazo-dyestuff of the formula

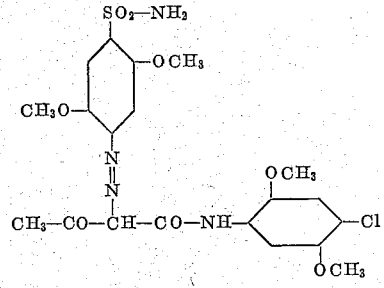

3. The water-insoluble monoazo-dyestuff of the formula

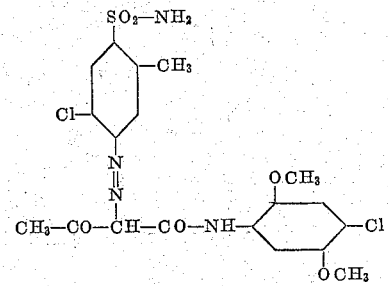

4. The water-insoluble monoazo-dyestuff of the formula

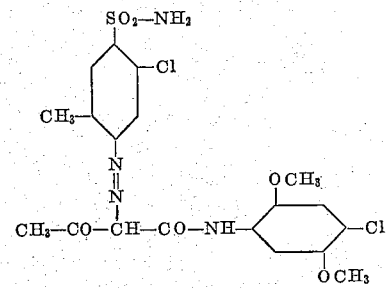

References Cited in the file of this patent

UNITED STATES PATENTS

| 2,734,895 | Zickendraht et al. | Feb. 14, 1956 |
| 2,863,860 | Mitchell et al. | Dec. 9, 1958 |

FOREIGN PATENTS

| 904,886 | Germany | Feb. 22, 1954 |